United States Patent [19]

Heuss

[11] 4,188,874
[45] Feb. 19, 1980

[54] PRESS WITH TWO PRESSURE ROLLERS

[75] Inventor: Valentin Heuss, Uitikon-Waldegg, Switzerland

[73] Assignee: Escher Wyss Limited, Zurich, Switzerland

[21] Appl. No.: 859,270

[22] Filed: Dec. 9, 1977

[30] Foreign Application Priority Data

Dec. 16, 1976 [CH] Switzerland ............ 015808/76

[51] Int. Cl.² .................... B30B 3/04; B21B 13/02
[52] U.S. Cl. .................... 100/170; 100/162 B; 29/116 AD; 72/237; 101/153
[58] Field of Search .............. 100/155–176; 29/116 R, 116 AD, 113 R, 113 AD; 162/358, 373; 72/223, 237; 101/152, 153–157

[56] References Cited

U.S. PATENT DOCUMENTS

| 775,346 | 11/1904 | Cox | 72/237 |
|---|---|---|---|
| 1,599,868 | 9/1926 | Barton et al. | 100/172 X |
| 1,911,682 | 5/1933 | Gardiner et al. | 100/167 X |
| 2,783,689 | 3/1957 | Skoldkvist | 162/358 X |
| 2,941,576 | 6/1960 | Schenkengel | 100/156 X |
| 3,119,324 | 1/1964 | Justus | 100/170 |
| 3,547,776 | 12/1970 | Curtis | 162/358 X |
| 3,867,879 | 2/1975 | Schlunke et al. | 100/162 R |
| 4,069,569 | 1/1978 | Meckel et al. | 29/116 AD |

FOREIGN PATENT DOCUMENTS

| 687191 | 1/1940 | Fed. Rep. of Germany | 100/170 |
|---|---|---|---|
| 564977 | 6/1957 | Italy | 100/170 |

Primary Examiner—Peter Feldman
Attorney, Agent, or Firm—Robert A. Ostmann

[57] ABSTRACT

Press having a stand in which two pressure rollers are mounted and form between them a press gap for the pressure treatment of a web of material; the stand is open on one side of the pressure rollers and at least one of the pressure rollers is a pressure equalization roller having mounted non-rotatably in the stand an axial bracket about which a roller shell is rotatable, which is braced against the bracket by hydrostatic supporting elements in a bracing plane determined by the axes of the pressure rollers.

10 Claims, 10 Drawing Figures

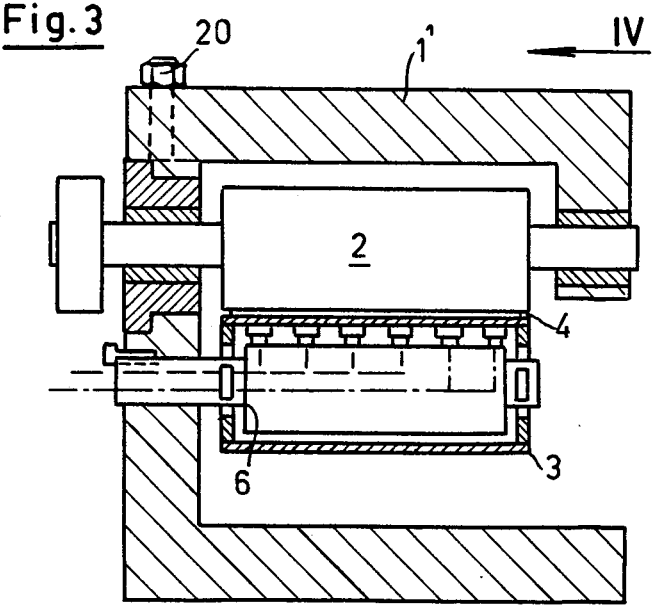
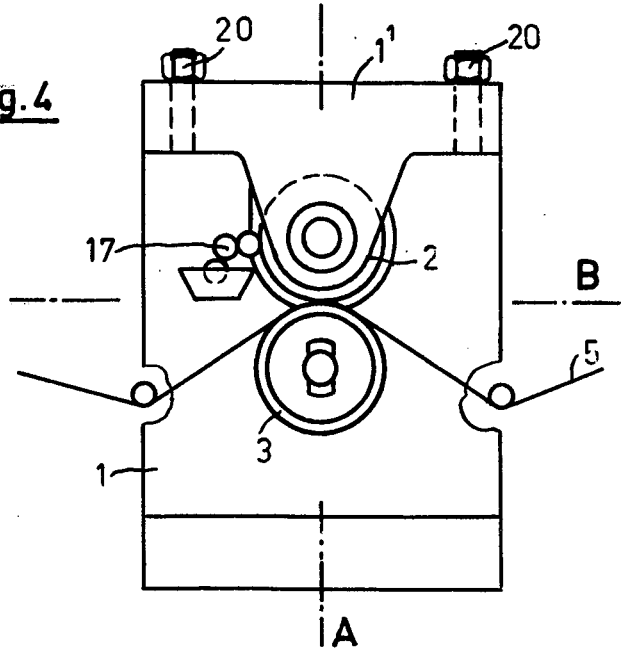

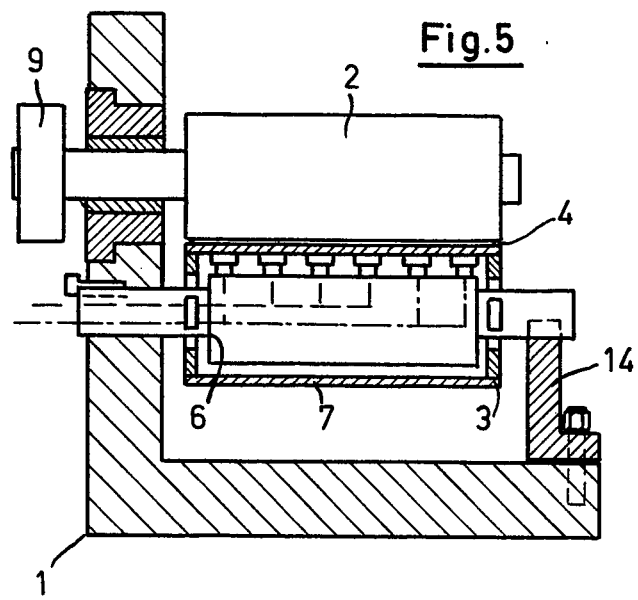
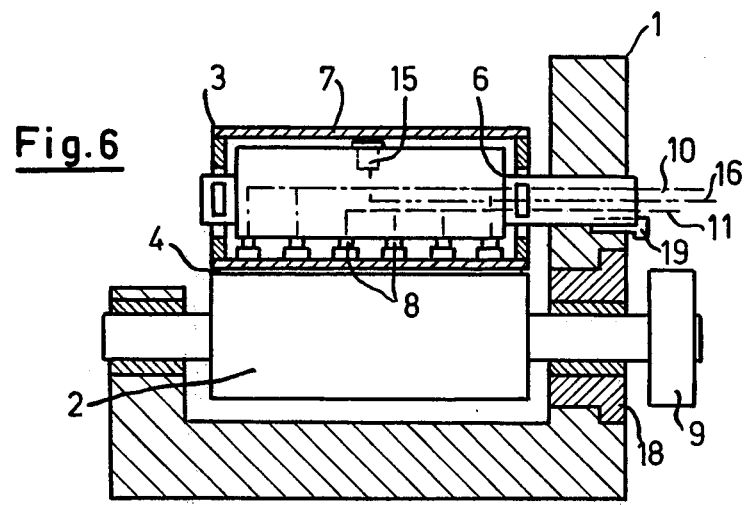

PRESS WITH TWO PRESSURE ROLLERS

BACKGROUND OF THE INVENTION

The invention relates to a press having a stand in which two pressure rollers are mounted and form between them a press gap for the pressure treatment of a web of material.

Such presses for treating a web of material, more particularly in the printing, textile or paper industry, have hitherto been relatively heavy and complicated machines. It is mainly the desiderata to be fulfilled of uniform pressure treatment of the web of material across its total width in the press gap, which lead to a compact and massive mode of construction. Consequently the operation of such presses is also generally complicated, such as the exchanging of the rollers, the introduction of the web of material into the press gap, or the adjustment of the pressure in the press gap.

SUMMARY OF THE INVENTION

It is the aim of the invention to simplify a press of the type initially described and thereby also to produce a lighter construction. The operation of the novel machine is also intended to be simpler.

This aim is achieved according to the invention in that the stand, considered in a section through the press along the plane which is determined by the axes of the pressure rollers, is open with respect to the space surrounding the press on one side of the pressure rollers at least along a plane which extends through the press gap and at right angles to the plane determined by the axes of the pressure rollers, and that at least one of the pressure rollers is a pressure equalization roller having mounted nonrotatably in the stand an axial bracket about which a roller shell is rotatable which is braced against the bracket by hydrostatic supporting elements in a bracing plane determined by the axes of the pressure rollers. The stand open with respect to the space permits access to the press gap from the side of the pressure rollers, and it is possible to push the web of material to be treated directly into the press gap from the side. The construction of the open stand is lighter, because owing to the use of the at least one pressure equalization roller any deformation of the stand which occurs and the resulting variation of the press gap are automatically compensated by the hydrostatic supporting elements of the pressure equalization roller.

According to one embodiment the stand opens towards the space, considered in the section along the plane determined by the axes of the pressure rollers, exhibits a C-shaped or an L-shaped open profile, and a preferred embodiment is obtained in that at least one of the pressure rollers mounted in the open stand is arranged cantileverly in the stand, so that its axle is braced in the stand on only one side of the pressure roller like a cantilever bracket.

Due to these measures the press is considerably lighter and simpler than previous constructions. The stand is considerably reduced thereby compared to known presses and bearings are economised. The pressure rollers are easily accessible for operating purposes and can be exchanged in simple manner. The adjustment of the pressure in the press gap occurs exclusively through the intermediary of the supporting elements of the at least one pressure equalization roller.

BRIEF DESCRIPTION OF THE DRAWING

The object of the invention is explained more fully hereinbelow with reference to exemplarly embodiments illustrated schematically in the drawings, wherein:

FIGS. 1, 2, 3, 5 and 6 each show a different exemplary embodiment of a press in a partial section along the plane which is determined by the axes of the pressure rollers, FIG. 4 shows an elevation in the direction of the arrow IV in FIG. 3.

DESCRIPTION OF THE PREFERED EMBODIMENTS

Figure 1:
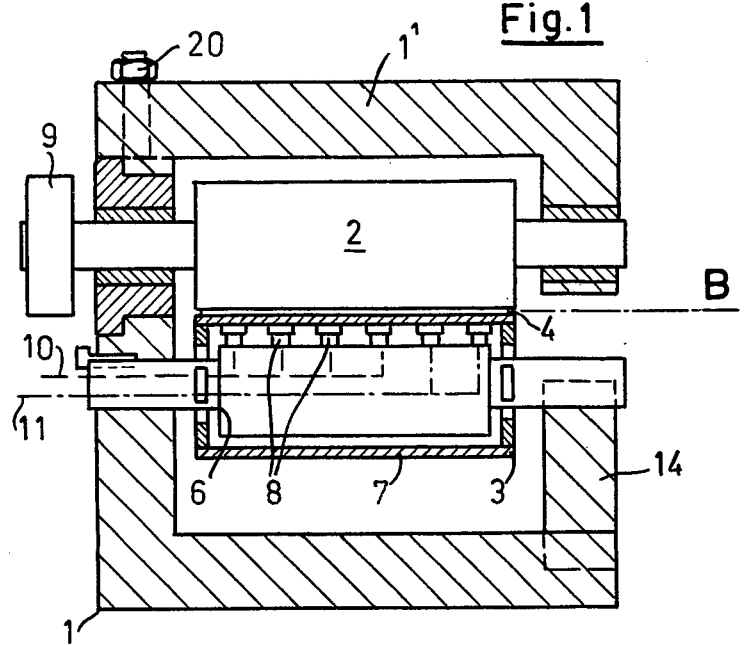

The press comprises a stand 1 in which a pressure roller 2 and a pressure roller 3 are mounted to each other parallel and form between them a press gap 4 for the pressure treatment of a web of material. The web of material is shown in FIG. 4 and designated 5.

Considered in a section through the press along the plane A which is determined by the axes of the pressure rollers 2 and 3, the stand 1 is open with respect to the space surrounding the press on one side of the pressure rollers (right-hand side in FIG. 1) at least at a plane B which extends through the press gap 4 and at right angles to the plane A determined by the axes of the pressure rollers 2 and 3.

The two planes A and B mentioned are shown particularly clearly in FIG. 4.

Figure 2:
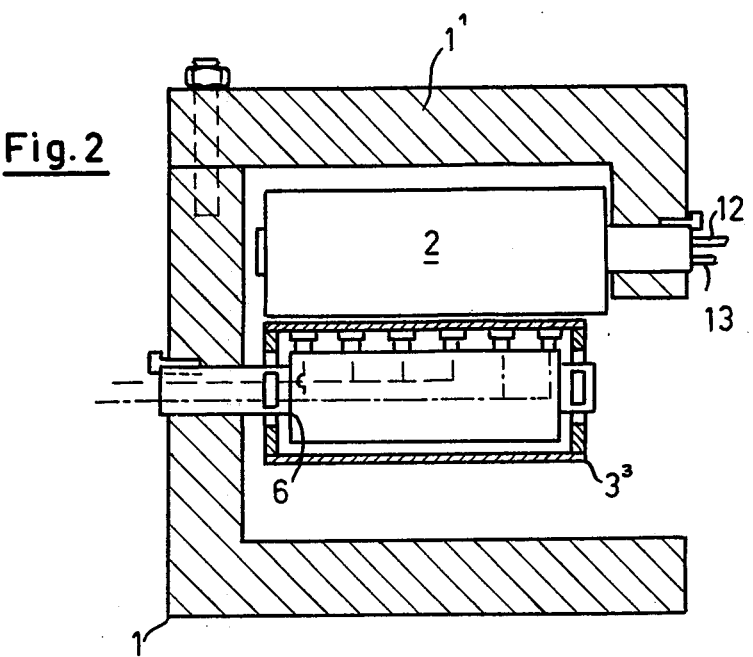

Considered in the section mentioned, the stand 1 therefore exhibits an open C-shaped or L-shaped profile, such as may be seen e.g. in FIGS. 1, 2 and 3 (C-shaped profile) and e.g. in FIGS. 5 and 6 (L-shaped profile).

At least one of the two pressure rollers mounted in the open stand 1 is a pressure equalization roller, which is designated 3. Said pressure equalization roller 3 exhibits, mounted non-rotatably in the stand 1, an axial bracket 6 about which a roller shell 7 is rotatable. Said roller shell 7 is rotatable with reference to the bracket 6 and is braced against the bracket 6 by hydrostatic supporting elements 8, namely in a bracing plane which is identical with the plane A determined by the axes of the pressure rollers 2 and 3.

The other pressure roller 2 in FIG. 1 is a solid roller, which is driven through the intermediary of a wheel 9.

A pressure in the press gap 4 is produced exclusively by the hydraulic supporting elements braced against the axial bracket 6, namely by means of a pressure medium which is passed to the supporting elements 8 through pipes 10 and 11.

Under the pressure in the press gap 4 the stand 1 becomes deformed, i.e. opens, its opening along the plane B becomes enlarged and the axis of the one pressure roller 2 and the axis of the pressure compensation roller 3 or its bracket 6 no longer extend mutually parallel, but intersect one another and sag. However, these variations are automatically compensated by the supporting elements 8, which force the rotatable shell 7 towards the pressure roller 2 along the bracing plane A.

In this manner the clearence of the press gap and the pressure treating the web of material always remain constant across the total width of the web of material.

In advantageous manner, at least one of the pressure rollers 2 and 3 mounted in the open stand 1 is arranged cantileverly in the stand, so that its axle is braced in the stand on only one side of the pressure roller like a cantilever bracket.

The press illustrated in FIG. 3 comprises a pressure equalization roller 3 which is arranged cantileverly in the stand 1. Its axial bracket 6 is braced non-rotatably in the stand 1 on only one side of the pressure equalization roller like a cantilever bracket. The pressure equalization roller 3 is located beneath the other solid roller 2, which is braced in the stand on both sides. The deformations of the stand, of the axle of the solid roller 2 and of the bracket 6 which occur during pressure in the press gap 4 are compensated, as already described hereinbefore, by the hydrostatic supporting elements 8 of the pressure equalization roller.

In the press illustrated in FIG. 2 both pressure rollers 2 and 3 are pressure equalization rollers and both are arranged and braced cantileverly in the stand 1. As may be seen in the illustrated section through the press along the plane determined by the axes of the pressure rollers 2 and 3, one pressure roller 3, beneath in the figure, is braced cantileverly in the stand on one side of the stand 1, the left-hand side in the figure, and the other pressure roller 2, the upper one in the figure, is braced cantileverly in the stand on the other opposite, i.e. on the right-hand side of the stand.

Of the pressure rollers 2 and 3, which are both pressure equalization rollers, their respective axial brackets arranged cantileverly in the stand 1 and are respectively braced in the stand 1 like cantilever brackets. The axial bracket of the upper pressure roller 2 is only partly visible in the figure. The rotary shell of the upper pressure roller 2, which is also a pressure equalization roller, is driven. The drive of the shell is effected by means of a hydraulic motor, not visible in the figure, which is arranged within the shell, between the shell and the axial bracket. A pressure medium to drive the motor is supplied to and discharged from the motor by means of pipes 12 and 13.

The press illustrated in FIG. 5 exhibits a stand 1 which shows an open L-shaped profile in the section illustrated. The upper pressure roller 2 in the figure is a solid roller and driven through a wheel 9. It is arranged cantileverly in the stand. The lower pressure roller 3 in the figure is a pressure equalization roller and is braced in the stand 1 on both sides. A stay 14, which braces the axial bracket 6 of the pressure equalization roller on the right-hand side of the figure is attached removably to the stand 1. When the pressure is switched off the shell 7 sinks downwards and a press gap 4 between the rollers is thereby accessible.

In the press illustrated in FIG. 6 the upper pressure roller 3 in the figure is a pressure equalization roller and is arranged cantileverly and braced in the stand 1. A pressure element 15 is provided on the axial bracket 6 in order to open the press gap 4. A pressure medium is supplied to said pressure element 15 through a pipe 16. By switching off the pressure in the supporting elements 8 and pressurising the pressure element 15, the shell 7 is raised and the press gap 4 is opened. In the exemplary embodiments according to FIGS. 1 to 6 hitherto described, the plane A determined by the axes of the pressure rollers 2 and 3 mounted in the open stand 1 extends vertically in space, as may be seen more particularly in FIG. 4.

Figure 7:
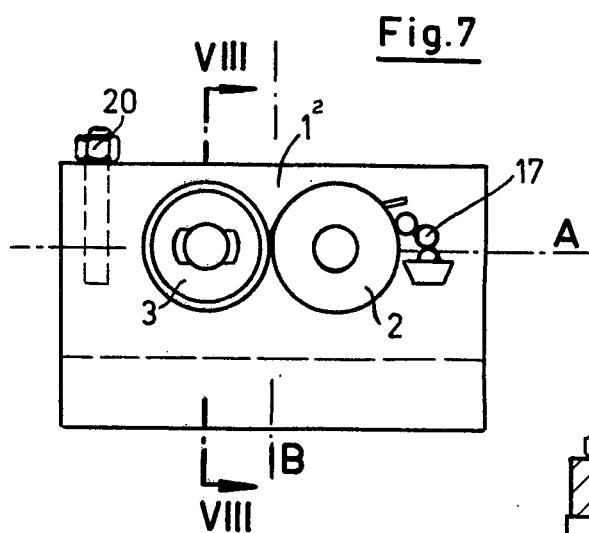
FIG. 7 shows a press in elevation from the side of the pressure rollers.
Figure 8:
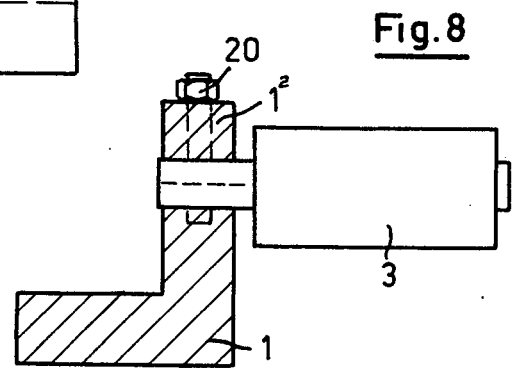
FIG. 8 shows a partial section made along the line VIII—VIII in FIG. 7.

FIGS. 7 and 8 show a press in which the plane A determined by the axes of the pressure rollers 2 and 3 mounted in the open stand 1 extends horizontally in space.

The pressure rollers 2 and 3 are each arranged demountably with reference to the stand 1. Thus the pressure roller 2 in FIG. 6 can be demounted in the axial direction together with a bearing housing 18. Likewise the pressure roller 3 in FIG. 6 can be demounted in the axial direction. A fixing wedge 19 is removed for this purpose.

The pressure roller 2 in FIGS. 3 and 4 can be demounted from the stand 1, e.g., in the direction of the plane A determined by the axes of the pressure rollers 2 and 3. For this purpose the stand exhibits a removable part $1^1$, which is fixed to the stand by means of screws 20. The pressure roller 2 is mounted in the removable part $1^1$.

Figure 9:
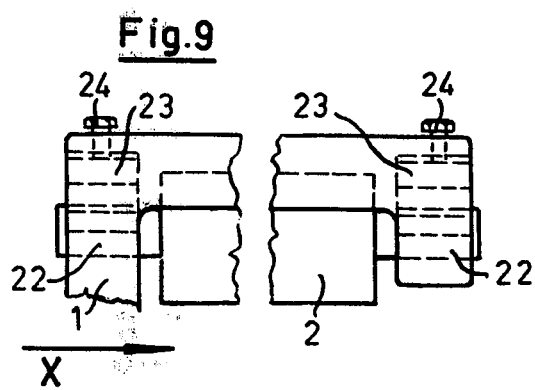
FIG. 9 shows a detail with a pressure roller mounted in the stand.
Figure 10:
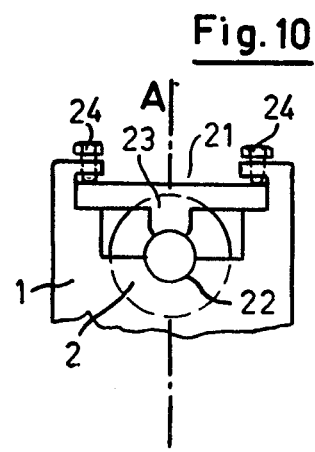
FIG. 10 shows an elevation in the direction of the arrow X in FIG. 9.

The pressure roller 2 in FIGS. 9 and 10 can also be demounted in the direction of the plane A. For this purpose the stand 1 exhibits in the direction of the plane A an opening 21 in which the pressure roller 2 is mounted. On each of the two sides of the pressure roller 2 a bearing 22 is provided in the stand 1, in which the pressure roller is retained by means of a T-shaped piece 23. The T-shaped piece 23 is fixed to the stand 1 by means of screws 24. After removing the T-shaped piece 23, the pressure roller 2 can be demounted from the stand.

The pressure rollers 2 and 3 in FIGS. 7 and 8 can be demounted from the stand 1 perpendicularly in direction to the plane A determined by the axes of the pressure rollers, i.e. in the direction of the plane which is designated B in the figure. For this purpose the stand 1 exhibits a removable part $1^2$ which is fixed to the stand by means of screws 20. The dividing line between the stand 1 and the part $1^2$ extends along the said plane A. After removing the part $1^2$ the two pressure rollers 2 and 3 can be lifted and removed.

The presses illustrated in FIGS. 4 and 7 are intaglio printing presses for printing a web of material 5. A device for applying an ink to the pressure roller 2 is designated 17 in each of the two figures.

It is clear from the exemplary embodiments that according to the invention, not only is the press gap 4 more easily accessible and simpler to operate than in the previous presses, but that also simultaneously the exchanging of the pressure rollers, e.g. when changing printing patterns, is simpler. An exchangeable roller shell for the pattern change can therefore be installed in simple manner.

I claim:

1. A press comprising a pair of pressure rollers mounted in a stand and defining a press gap for the pressure treatment of a web of material,
   a. the stand being open to the space surrounding the press at one side of the rollers, at least along a plane which passes through the press gap and is normal to the pressing plane containing the axes of the rollers, and being deflectable by the pressing forces acting on the rollers to thereby cause the axes of the rollers to diverge during pressing operations, and
   b. at least one of the rollers being of the pressure equalization type and including a non-rotatable axial bracket mounted in the stand, a shell which rotates about the bracket, and a group of hydrostatic supporting elements which support the shell on the bracket and are arranged in said pressing plane, c. the hydrostatic supporting elements serving to adjust the shell so as to compensate variations in the press gap attributable to flexure of the rolls as well as to divergence of the roller axes caused by deformation of the stand, whereby the thickness of the press gap and the pressure applied to the web material by the rollers are maintained contstant across the width of that material.

2. A press as defined in claim 1 in which the stand has a C-shaped, open profile in a cross-section taken along the pressing plane.

3. A press as defined in claim 1 in which at least one of the rollers is mounted in the stand in cantilever fashion.

4. A press as defined in claim 1 in which the axial bracket of the pressure equalization roller is mounted in the stand at only one side of the press gap, whereby the pressure equalization roller is mounted in cantilever fashion.

5. A press as defined in claim 1 in which both rollers are mounted in the stand in cantilever fashion, and said mountings for the rollers are located at opposite sides of the press gap.

6. A press as defined in claim 1 in which said pressing plane is vertical.

7. A press as defined in claim 1 in which said pressing plane is horizontal.

8. A press as defined in claim 1 in which at least one of the rollers is mounted in the stand by detachable means which permits removal of the rollers from the stand in the axial direction of the roller.

9. A press as defined in claim 1 in which at least one of the rollers is mounted in the stand by detachable means which permits removal of the roll from the stand in a direction which is normal to the roll axis and lies in said pressing plane.

10. A press as defined in claim 1 in which at least one of the rollers is mounted in the stand by detachable means which permits removal of the roller from the stand in a direction normal to said pressing plane.

* * * * *